(12) United States Patent
Srivastava

(10) Patent No.: US 6,594,622 B2
(45) Date of Patent: Jul. 15, 2003

(54) SYSTEM AND METHOD FOR EXTRACTING SYMBOLS FROM NUMERIC TIME SERIES FOR FORECASTING EXTREME EVENTS

(75) Inventor: Ashok N. Srivastava, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 09/726,698

(22) Filed: Nov. 29, 2000

(65) Prior Publication Data

US 2003/0004692 A1 Jan. 2, 2003

(51) Int. Cl.[7] .............................................. G06F 17/60
(52) U.S. Cl. ....................... 702/189; 702/176; 702/179; 702/181; 705/7; 705/10
(58) Field of Search ................................. 702/189, 124, 702/126, 176, 179–181, 196, 191, 193–195, 177, 178, FOR 103, FOR 104, FOR 134, FOR 139, FOR 154, FOR 166, FOR 167, FOR 170; 705/10, 7; 703/2; 708/134, 514; 700/73, 74; 706/21, 925, 932

(56) References Cited

U.S. PATENT DOCUMENTS 5,444,819 A * 8/1995 Negishi ......................... 705/7
5,761,386 A * 6/1998 Lawrence et al. ............ 705/10
6,055,491 A * 4/2000 Biliris et al. ................ 702/176
6,278,961 B1 * 8/2001 Kadtke et al. .............. 702/189

OTHER PUBLICATIONS

"The Singular Value Decomposition and It's Applications in Image Processing", by C.J. Ogden, et al., College of the Redwoods, Dec. 18, 1997, pp. 1–12.
Matrix Analysis,. by Roger A. Horn, et al., Cambridge Press 1985, pp. 414–415.(No month).

* cited by examiner

Primary Examiner—Hal Wachsman
(74) Attorney, Agent, or Firm—Scully, Scott, Murphy & Presser; William Schiesser

(57) ABSTRACT

A method for predicting extreme changes in numeric time series data includes converting a numeric time series into a sequence of symbols. A prediction method, such as a neural network or nearest neighbor algorithm is used to make the forecast. A numeric time series data is identified with extreme changes in them, and a window of length W that precedes the extreme change is extracted. Those extracts of a time series are built into a matrix (characteristic matrix) for singular value decomposition. The built matrix undergoes singular value decomposition, which reveals the characteristic vectors (symbols) that are indicative of time series that have characteristics that precede an extreme event. To perform forecasting, a window of length W in a new time series is generated and the dot product of the windows is taken against a predetermined number of columns of characteristic matrix, and, forecasting is performed on the new series.

10 Claims, 5 Drawing Sheets

SYSTEM AND METHOD FOR EXTRACTING SYMBOLS FROM NUMERIC TIME SERIES FOR FORECASTING EXTREME EVENTS

BACKGROUND OF THE INVENTION

1. Field of the Invention

This invention relates generally to systems and methods for recording and processing time series data, i.e., numeric data that are recorded in time sequence, and particularly to a system and method for predicting an extreme change in a time series given past given past values of the series using symbol extraction.

2. Discussion of the Prior Art

One problem that often arises when recording and processing time series data is that the numeric data are too noisy. Noise can be due to measurement error of the time series, or due to process noise which arises in situations where the data that are measured are subject to shocks due to the data generation process. For example, in a stock market scenario, where a future stock value (of a time series) is to be predicted given past values of the series, each stock price at a given time is due to the impact of every trader on the market. Thus, it is said that the measurements are due to process noise. In these events, it is necessary to invoke "noise reduction strategies," i.e., methods to reduce the noise present in the observations.

Signal processing technology is replete with numerous noise reduction techniques. The following references: Scharf, et. al. entitled L. L. Scharf, Statistical Signal Processing: Detection, Estimation, and Time Series Analysis (New York: Addison-Wesley Publishing Co., 1990); L. L. Scharf, "The SVD and Reduced Rank Signal Processing," Chapter 1 in The SVD and its Applications, R. Vaccaro, ed. (Elsevier, 1991); and, "Digital Signal Processing," by Richard A. Roberts, Clifford T. Mullis (Contributor). Hardcover (February 1987) outline some of the well-known noise reduction strategies. One particular signal processing noise reduction technique is known as singular value decomposition as described in the reference to C. R. Rao entitled "Linear Statistical Analysis and its Applications" (1963).

Another method for processing time series signals, in particular, utilizes moving average techniques to reduce noise. Moving averages are computed by taking subsets of sequences of numbers, computing the average of those numbers, recording the result, and then shifting the subset by one unit in time. Other noise reduction techniques include the application of a digital filter. Essentially, most of the noise reduction techniques rely on moving averages of the data, which do not generate symbol sequences.

It would be highly desirable to provide an improved method and mechanism for forcasting future time series values, and particularly, extreme events, based on past time series data values.

It would additionally be highly desirable to provide an improved method for processing time series signals in which a time series is converted to a symbol sequence comprising sets of finite symbols which may be used as a basis for forcasting future time series values.

SUMMARY OF THE INVENTION

It is an object of the present invention to provide a method for extracting symbols from a numeric time series of data which symbols provide the basis for forecasting values from future time series.

According to the invention, there is provided a method for extracting symbols from a numeric time series comprising the steps of: receiving a finite time series of data elements for a particular application, the data elements characterized as having one or more sharp changes in values; for each sharp change in the finite time series, extracting a window of elements from the time series that precedes each sharp change; building a matrix from the time series window extracts; performing singular value decomposition on the built matrix to obtain characteristic matrices; and, obtaining vectors of symbols from resulting characteristic vectors determined from the singular value decomposition step, wherein the resulting symbols are used by forecasting algorithm to predict a future sharp change in subsequent finite time series received for the application.

Advantageously, the sets of finite symbols obtained may be used as the basis for applications requiring the prediction of an extreme change in a received time series.

BRIEF DESCRIPTION OF THE DRAWINGS

The foregoing objects and advantages of the present invention may be more readily understood by one skilled in the art with reference being had to the following detailed description of a preferred embodiment thereof, taken in conjunction with the accompanying drawings, in which.

DETAILED DESCRIPTION OF THE PREFERRED EMBODIMENTS

Figure 3:
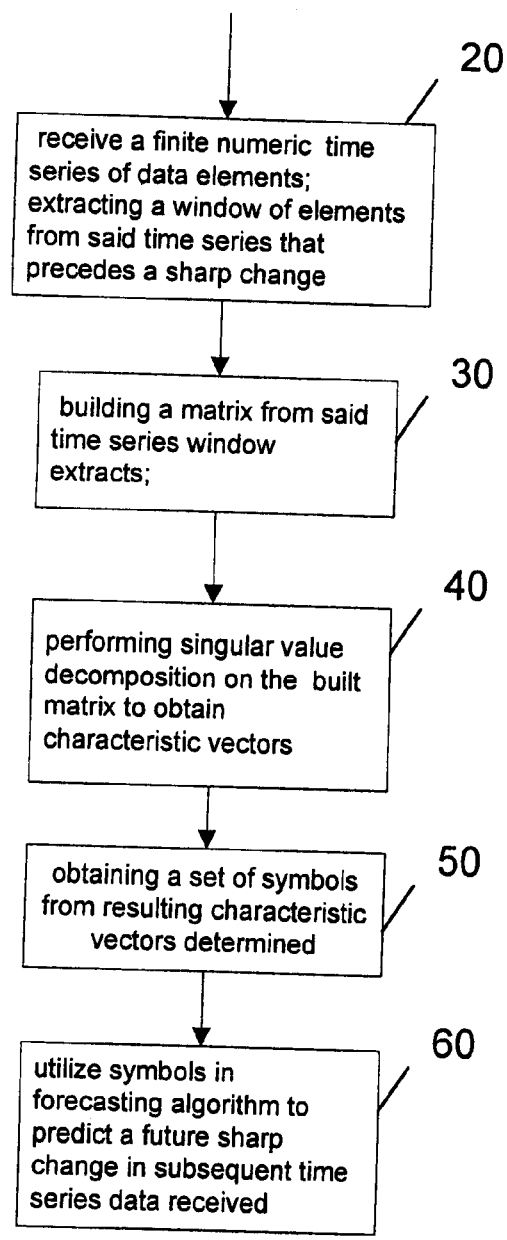
FIG. 3 is a flow chart depicting the methodology for extracting symbols from numeric time series data for forecasting extreme events according to the invention.

According to the principles of the invention, assuming that a large time-series of data is received having values in which a sharp (extreme) change is exhibited, the method of the present invention as depicted in FIG. 3 includes steps for:

(1) extracting a window of the time series data that immediately precedes each sharp change (step (20));

(2) building a matrix of these time series extracts by placing each time series vector in row-major order (step (30));

(3) performing singular value decomposition on this matrix to obtain characteristic vectors (steps (40 and 50)); and, (4) using the resulting characteristic vectors as the symbols in a forecasting algorithm to predict a future sharp change in subsequent numeric finite time series data received (step (60)).

According to the invention, a sharp (extreme) change is defined as being a change of 30% in the time series over 10 units of time.

More particularly, the symbol extraction algorithm is as follows:

Given a finite time series of length T with values denoted as y(t), with N extreme changes at time steps {k(1), k(2), ..., k(N)}; then, choose a window size W and compute the following:

a) Set j=1
  b) Let x(j)=[y(k(1)−W), y(k(2)−W), ..., y(W)]
  c) Let X=[X; x(j)];
  d) Repeat until j=N A typical value is W=25, however, as known to skilled artisans, is dependent upon the application. When the steps a)–d) are performed, the result is a matrix X, (N×W matrix).

The next step involves computing the well known singular value decomposition ("svd") of the resulting matrix X. That is:

e) perform svd(X)=[U, S, V]

Specifically, given matrix X, the well known mathematical transformation $X=U\ S\ V^T$ is performed where S is a diagonal (N×W) matrix and U and V are the characteristic orthogonal matrices such that U is an N×N matrix and V is an W×W matrix. As known, the columns of the matrix U are the left singular vectors of the matrix A and the column space of the matrix V (or the row space of $V^T$) are the right singular vectors of the matrix A;

According to the preferred embodiment of the invention, the symbols to be used for subsequent forecasting are held in the matrix V.

When a new time series arrives, sequential windows of the series are taken. A computation is then performed to take a normalized dot-product against the characteristic vectors. These scores (the normalized dot-product) become the new time series. It is the case that the resultant scores have a better signal to noise ratio, and therefore can be used to make a prediction of whether or not the extreme change is going to occur in the time series. More particularly, the forecasting technique on the new series is as follows:

f) receive a new time series z(t);
  g) generate windows of length W in the new time series;
  h) compute the dot product of the windows against a predetermined number of columns of characteristic matrix V; and,
  i) perform forecasting on the new series.

It has been experimentally determined that the predetermined number of columns of the characteristic matrix V in which the dot product is computed is the first five (5) columns. In theory, it may be any number between 1 and W.

An example application of the present invention is now provided: In the example, the closing prices of stocks from a well known stock index (Russell 2000) for a particular year were gathered. This amounted to a time series of stocks corresponding to about 255 days of data for 2000 stocks. For each of the time series, there is calculated another time series that indicates the degree of extreme behavior that the time series exhibits.

Given a time series y(t), the extreme behavior signal is calculated as follows:

$$e(t)=(y(t-M)-y(t))/y(t-M)$$

Thus, if for a given value of t, e(t)=0.3, that means that the value of the time series y(t) changed by 30% in M time units.

Any time the signal e(t) crosses the threshold of 0.3, this is characterized as an extreme change. Note: the term 'disaster' and extreme behavior are used herein interchangably.

Figure 1A:
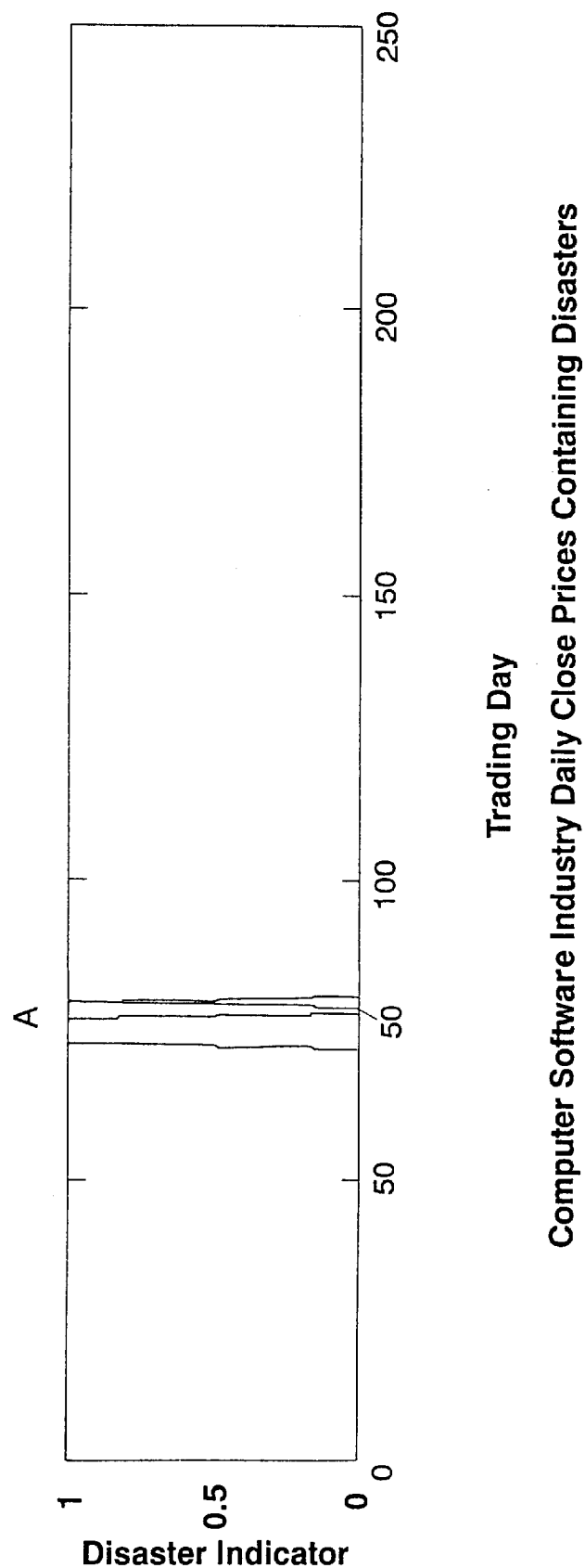
FIG. 1(a) indicates an example disaster indicator indicating an extreme event relating to a time series of data.
Figure 1B:
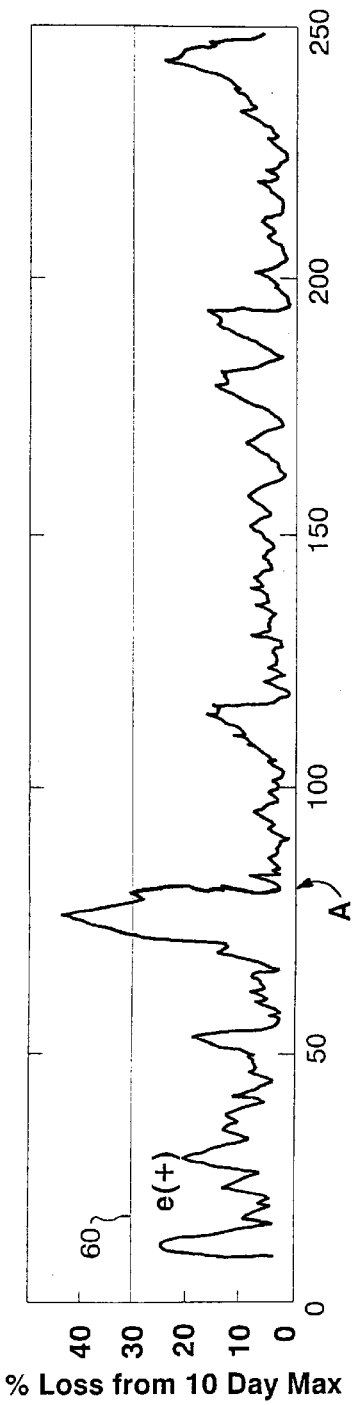
FIGS. 1(b) and 1(c) indicate respective example time series data signals e(t) and y(t) signals for determining extreme behavior signals used for forecasting extreme events in accordance with the principles of the invention.
Figure 1C:
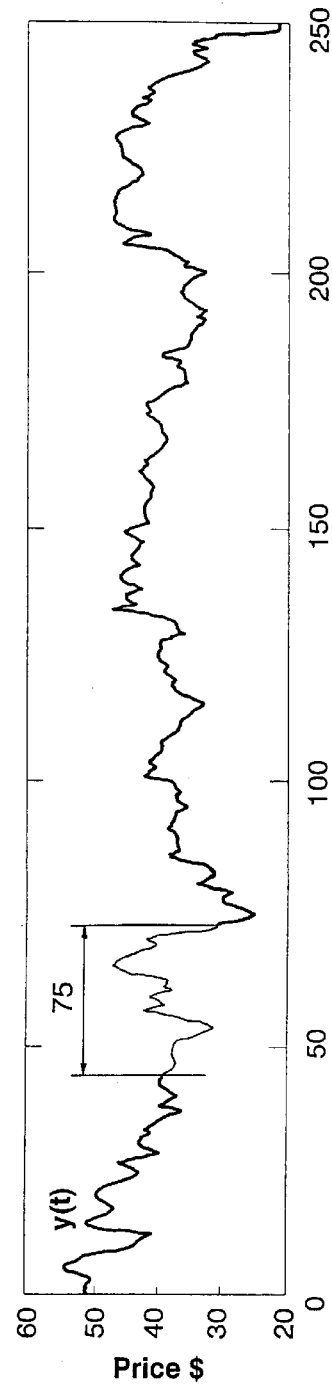
Figure 2A:
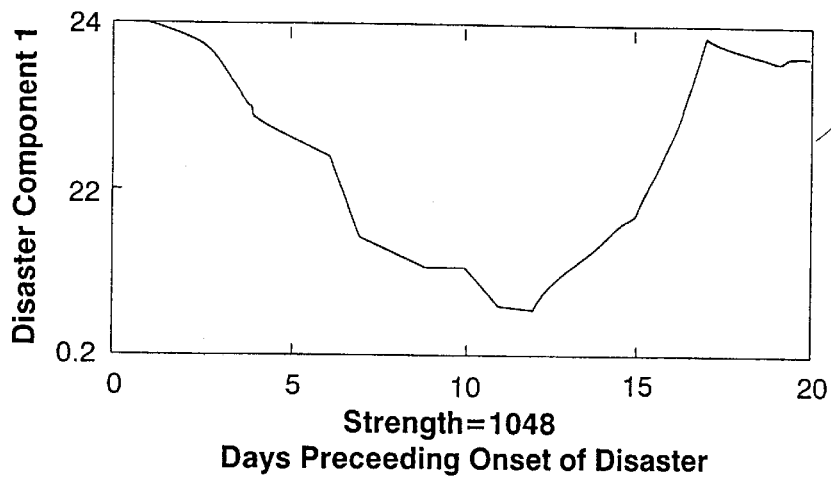
FIGS. 2(a)–2(f) illustrate a first six "extreme event" symbols that are derived for the example time series data according to the invention.
Figure 2B:
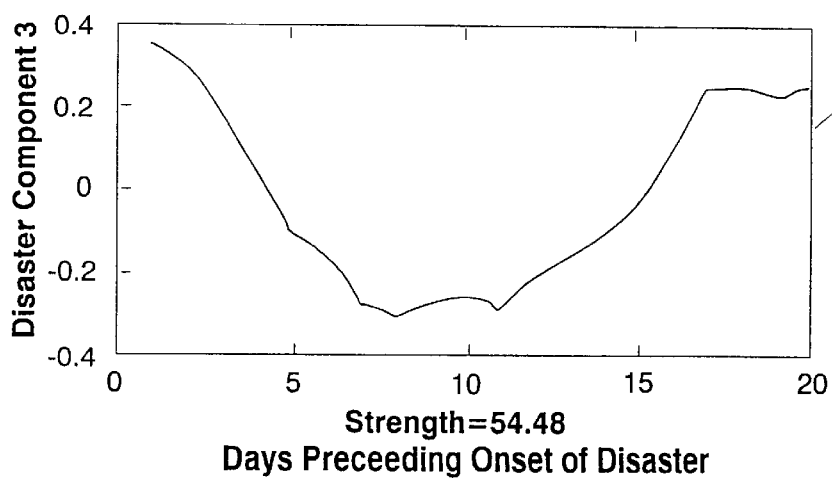
Figure 2C:
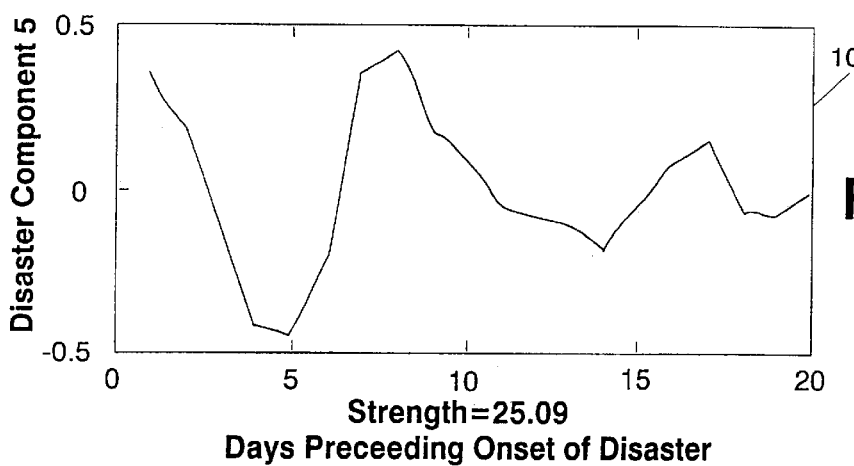
Figure 2D:
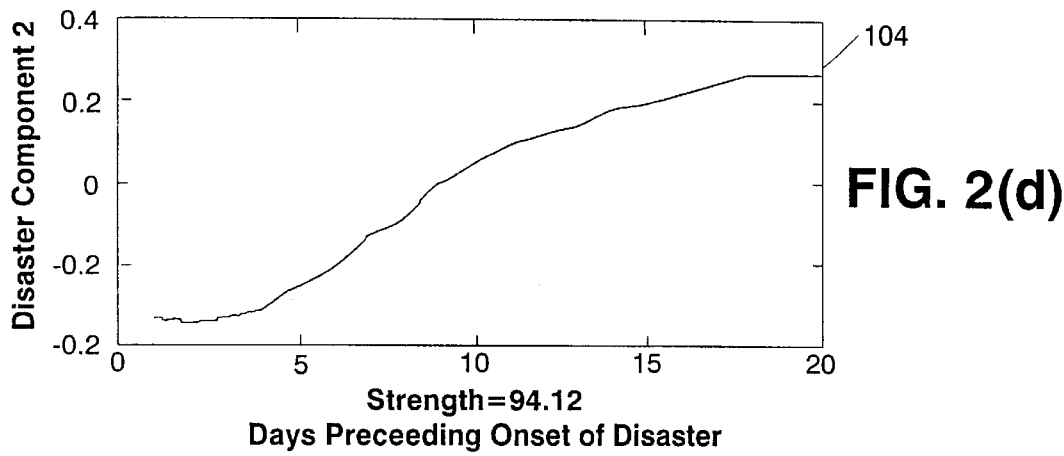
Figure 2E:
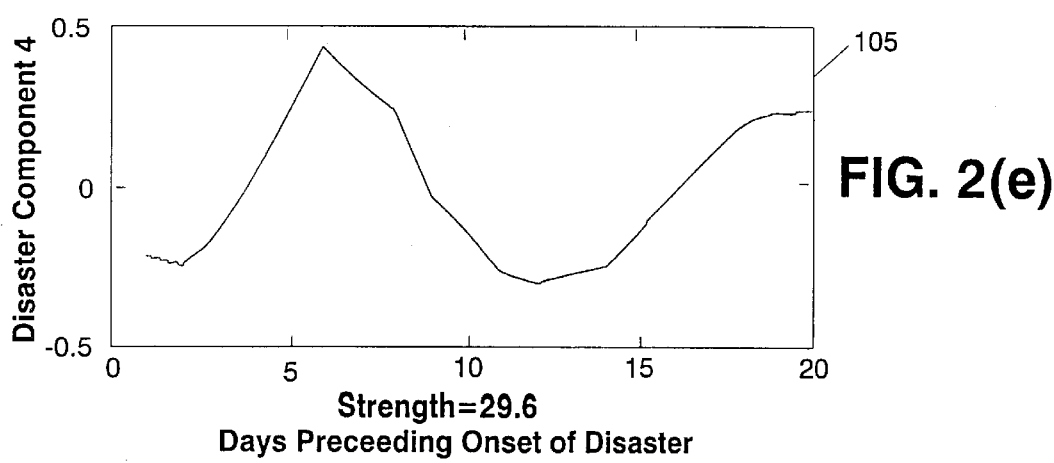
Figure 2F:
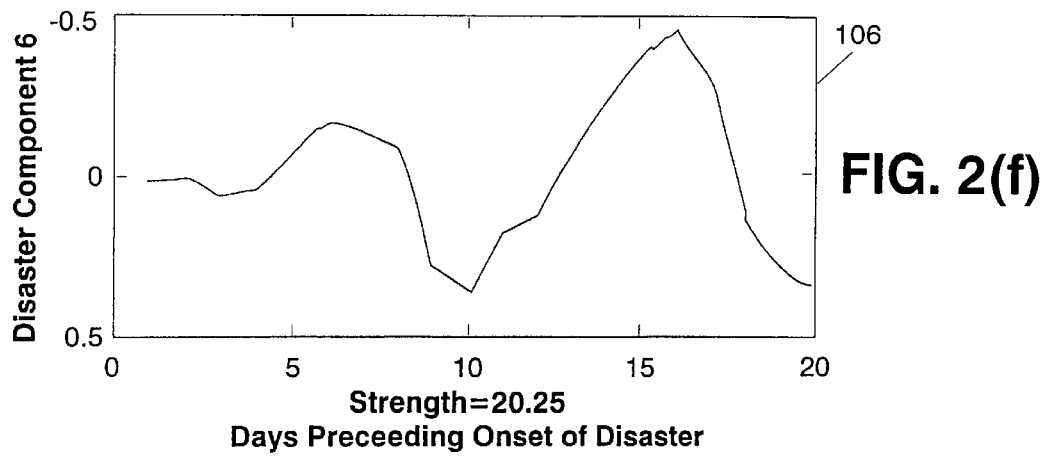

Whenever the extreme behavior signal crosses the threshold of 0.3 (or equivalently 30%), the price data that precedes it for the last 20 days (e.g., W=20, in this case) is extracted. FIG. 1(a) illustrates a disaster indication 50 for a company with ticker XXXX. FIG. 1(b) illustrates the extreme behavior signal e(t) indicating variations in stock price as compared to the 30% disaster threshold 60. The location of the disaster is indicated in the FIG. 1(b) by arrow A. In FIG. 1(c) there is illustrated the company XXXX price data signal y(t) for the example year and indicating the time window W that precedes the day when the threshold had been exceeded. According to this example, this data 75 is gathered for the prior 20 days (W=20).

After going through all 2000 stocks, an extreme events library in the form of a matrix X is formed. Each row of the matrix X corresponds to the W values of the time series that precede an extreme event. Thus, if the total number of extreme events is N, the size of the matrix X is N×W.

The decomposition is performed using the standard algorithm for singular value decomposition. New matrices U, S, and V are returned according to the equation: X=USV* The symbols reside in the columns of matrix V*.

FIG. 2 illustrates the first six (6) "extreme event" symbols 101–106 that are derived for the stock index for that particular year according to the invention. Once the extreme event symbols are generated, a search is conducted for those symbols in another time series. Thus, if there is a window in time where the time series includes those symbols, it is likely that an extreme event will occur. Thus, the next step includes mapping new signals onto the extreme event signals: For example, if it is desired to predict extreme events for the Russell 200 stock index for the next year, the following steps are performed:

1. Choose a time series;
  2. Extract a window of length W;
  3. Take the dot product (vector product) between the time series and the symbols.
  4. Implement a classifier to determine whether the values returned from the dot product are predictive of an extreme event.

If the values are close enough, it is likely that an "extreme event" may occur with high probability within the next M time units.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

I claim:

1. A method for predicting extreme changes in numeric time series data comprising the steps of:

a) receiving a finite time series of data elements from said numeric time series data, said finite time series of data elements characterized as having one or more sharp changes in values;
  b) for each sharp change in said finite time series of data elements, extracting a window of elements from said finite time series of data elements that precedes each sharp change;
  c) building a matrix from said finite time series window extracts;
  d) performing singular value decomposition on said built matrix to obtain characteristic vectors; and,
  e) obtaining a set of symbols from resulting characteristic vectors determined from said step d),
    wherein said resulting set of symbols are used by a forecasting algorithm to predict a future sharp change in subsequent finite numeric time series data received.

2. The method as claimed in claim 1, wherein each extracted window comprises a time series vector of data elements, said step c) of building a matrix includes placing each time series vector of data elements in row-major order.

3. The method as claimed in claim 2, wherein said finite time series comprises T data elements having values denoted as y(t), said T data elements further characterized as having N extreme changes at time steps {k(1), k(2), . . . , k(N)}, said step c) of building said matrix comprising the steps of:
   i) initialize index j=1;
   ii) calculate x(j)={y(k(1)−W), y(k(2)−W), . . . , y(W)}, x(j) being elements of said built matrix;
   iii) calculate said built matrix X={X; x(j)}; iv) repeat steps i)–iii) until j=N.

4. The method as claimed in claim 3, wherein said step d) of performing singular value decomposition (svd) on said built matrix comprises computing:
   X=USV$^T$ where matrices U, S and V are characteristic matrices, said set of symbols to be used for predicting a future sharp change in subsequent finite numeric time series data are held in the characteristic matrix V.

5. The method as claimed in claim 4, further including the step of implementing a forecasting algorithm on a new received time series of data elements to determine whether a sharp change is expected in said new numeric time series data, wherein prior to implementing a forecasting algorithm, the steps of:
   generating time series vector windows of length W in the new time series of data elements; and, computing a dot product of said time series vector windows against a predetermined number of columns of said characteristic matrix V.

6. A program storage device readable by a machine, tangibly embodying a program of instructions executable by the machine to perform method steps for predicting extreme changes in numeric time series data, the method steps comprising:
   a) receiving a finite time series of data elements from said numeric time series data, said finite time series of data elements characterized as having one or more sharp changes in values;
   b) for each sharp change in said finite time series of data elements, extracting a window of elements from said finite time series of data elements that precedes each sharp change;
   c) building a matrix from said finite time series window extracts;
   d) performing singular value decomposition on said built matrix to obtain characteristic vectors; and,
   e) obtaining a set of symbols from resulting characteristic vectors determined from said step d),
   wherein said resulting set of symbols are used to predict a future sharp change in subsequent finite numeric time series data received.

7. The program storage device readable by a machine as claimed in claim 6, wherein each extracted window comprises a time series vector of data elements, said step c) of building a matrix includes placing each time series vector of data elements in row-major order.

8. The program storage device readable by a machine as claimed in claim 7, wherein said time series comprises T data elements having values denoted as y(t), said T data elements further characterized as having N extreme changes at time steps {k(1), k(2), . . . , k(N)}, said step c) of building said matrix comprising the steps of:
   i) initialize index j=1;
   ii) calculate x(j)={y(k(1)−W), y(k(2)−W), . . . , y(W)}, x(j) being elements of said built matrix;
   iii) calculate said built matrix X={X; x(j)};
   iv) repeat steps i)–iii) until j=N.

9. The program storage device readable by a machine as claimed in claim 8, wherein said step d) of performing singular value decomposition (svd) on said built matrix comprises computing:
   X=USV$^T$ where matrices U, S and V are characteristic matrices, said set of symbols to be used for predicting a future sharp change in subsequent finite numeric time series data are held in the characteristic matrix V.

10. The program storage device readable by a machine as claimed in claim 9, wherein said method steps further includes the step of implementing a forecasting algorithm on a new received time series of data elements to determine whether a sharp change is expected in said new numeric time series data, wherein prior to implementing a forecasting algorithm, the steps of:
   generating time series vector windows of length W in the new numeric time series data; and,
   computing a dot product of said time series vector windows against a predetermined number of columns of said characteristic matrix V.

* * * * *